United States Patent
Kangas

(10) Patent No.: US 7,648,213 B2
(45) Date of Patent: Jan. 19, 2010

(54) MECHANISM FOR FASTENING CASING INTO WALL OPENING

(75) Inventor: Simo Kangas, Vaasa (FI)

(73) Assignee: ABB Oy, Helsinki (FI)

( * ) Notice: Subject to any disclaimer, the term of this patent is extended or adjusted under 35 U.S.C. 154(b) by 555 days.

(21) Appl. No.: 10/555,698

(22) PCT Filed: May 4, 2004

(86) PCT No.: PCT/FI2004/000268

§ 371 (c)(1),
(2), (4) Date: Nov. 4, 2005

(87) PCT Pub. No.: WO2004/100633

PCT Pub. Date: Nov. 18, 2004

(65) Prior Publication Data

US 2006/0273598 A1    Dec. 7, 2006

(30) Foreign Application Priority Data

May 6, 2003    (FI)    ................................... 20030677

(51) Int. Cl.
*A47B 95/00*    (2006.01)
(52) U.S. Cl. .................... 312/333; 312/334.1; 248/27.1; 248/27.3; 292/295
(58) Field of Classification Search ................. 312/333, 312/334.1; 248/27.1, 27.3; 455/345; 292/294, 292/295, 197, 210
See application file for complete search history.

(56) References Cited

U.S. PATENT DOCUMENTS

| 3,199,938 | A |   | 8/1965  | Vouk |
| 3,337,168 | A | * | 8/1967  | Albrecht ..................... 248/27.1 |
| 4,000,874 | A | * | 1/1977  | Finley et al. ................ 248/27.1 |
| 4,378,099 | A | * | 3/1983  | Ikeda et al. ................. 248/27.3 |
| 4,623,110 | A | * | 11/1986 | Kanari ....................... 248/27.1 |
| 5,020,151 | A | * | 5/1991  | Sampei et al. ............... 455/345 |

FOREIGN PATENT DOCUMENTS

| GB | 1123733 | 8/1968 |
| GB | 1333536 | 10/1973 |

OTHER PUBLICATIONS

Finnish International Search Report, dated Aug. 19, 2004.

* cited by examiner

*Primary Examiner*—Richard E Chilcot, Jr.
*Assistant Examiner*—Chi Q Nguyen
(74) *Attorney, Agent, or Firm*—Buchanan Ingersoll & Rooney PC

(57) ABSTRACT

A fastening mechanism for fastening a casing (2) into an opening in a wall (4), the mechanism comprising a collar element (6) fastened to the casing and arranged to be in contact with a first side of the wall, a pressing element (8) arranged to be in contact with a second side of the wall, the collar element and the pressing element being arranged to co-operate to direct a pressing force towards the wall, and a screw means (10) arranged to move the pressing element. The pressing element is arranged to rotate between a normal position and a mounting position; in the normal position the pressing element is capable of coming into contact with the second side of the wall to achieve a force keeping the casing (2) in place and in the mounting position it allows the casing to be pushed into the final mounting depth.

11 Claims, 1 Drawing Sheet

MECHANISM FOR FASTENING CASING INTO WALL OPENING

This disclosure is based upon Finland Application No. 20030677, filed May 6, 2003, and International Application No. PCT/FI2004/000268, filed May 4, 2004, the contents of which are incorporated herein by reference.

BACKGROUND OF THE INVENTION

The invention relates to fastening mechanisms and particularly to fastening mechanisms used for fastening a casing into an opening in a wall.

A plug-in unit assembly comprises a casing and a plug-in unit to be attached thereto. The plug-in unit assembly is usually mounted into an opening made in a wall.

In the prior art a casing of a plug-in unit assembly is fastened into a wall opening at least partly from the other side of the wall. The mounting of the plug-in unit assembly into the wall opening thus requires work to be done not only on the side of the wall where the plug-in unit of the assembly can be attached to and detached from the casing but also on the other side. The means for fastening the casing to the wall typically comprise separate fixing clips and screws.

A problem with the prior art mechanisms for fastening plug-in units is that the mounting of the plug-in unit assembly requires working on both sides of the wall to which the unit is to be mounted. Moreover, different loose accessories are needed in the mounting, which further slows down the mounting of the plug-in unit assembly and makes it more complicated.

BRIEF DESCRIPTION OF THE INVENTION

It is an object of the invention to provide a mechanism for fastening a casing, which mechanism allows the above problems to be solved. The object of the invention is achieved by a fastening mechanism characterized by what is stated in the independent claim. The preferred embodiments of the invention are disclosed in the dependent claims.

The invention is based on providing a pressing element that can be moved in the longitudinal direction of the casing and rotated about its axis of rotation between a normal position and a mounting position, whereby the pressing element, when in its normal position, is capable of coming into contact with the other side of the wall in order to achieve a force keeping the casing in place and, when in its mounting position, the pressing element allows the casing to be pushed into the final mounting depth thereof.

An advantage of the fastening mechanism of the invention is that all measures needed for mounting the casing can be carried out on the same side of the wall where the casing is to be mounted to. In addition, a casing provided with the fastening mechanism of the invention can be implemented such that all the mounting accessories are integrated into the casing and thus cannot come loose and be lost. Due to the above characteristics, the fastening mechanism of the invention may also speed up the mounting of the casing to the wall.

BRIEF DESCRIPTION OF THE DRAWINGS

In the following, the invention will be described in greater detail with reference to the preferred embodiments and the accompanying drawings, in which.

DETAILED DESCRIPTION OF THE INVENTION

Figure 1:
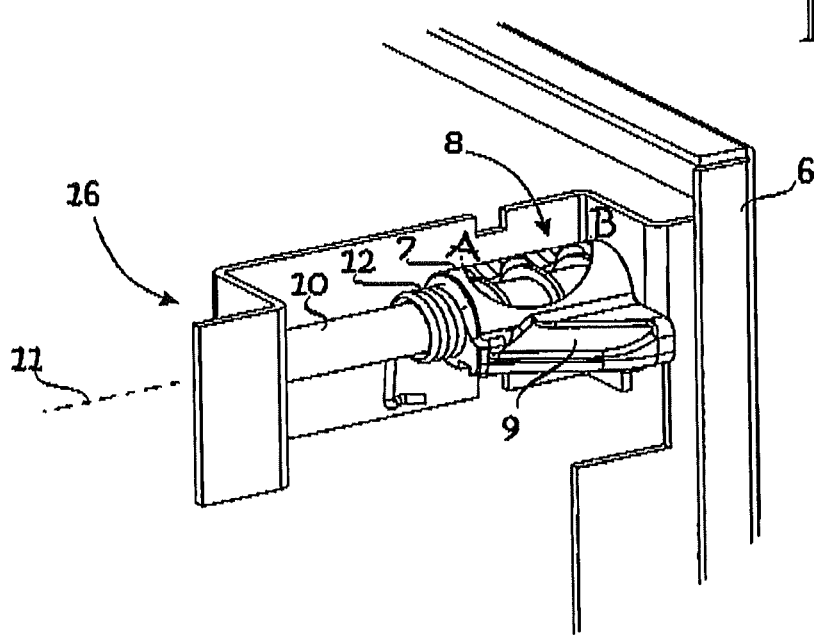
FIG. 1 illustrates a fastening mechanism according to an embodiment of the invention.

The fastening mechanism of FIG. 1 comprises a pressing element 8, a screw means 10, a spring means 12 coupled to the pressing element 8, and a collar means 6. The pressing means 8 is capable of rotating about its axis of rotation 11 between a normal position and a mounting position. If the pressing element 8 is deviated to the mounting direction, the spring means 12, which in the mechanism of FIG. 1 is a torsion spring, tends to return the element back to its normal position.

In FIG. 1 the pressing element 8 is in its normal position. It is also in its extreme position, in which its distance from the collar element 6 is at the minimum.

In the fastening mechanism of FIG. 1 the pressing element 8 and the spring means 12 are mounted coaxially with the screw means 10, i.e. the screw means goes through these components. In addition to a body 7 on top of the screw means 10, the pressing element 8 comprises a beveled guide part 9.

Figure 2:
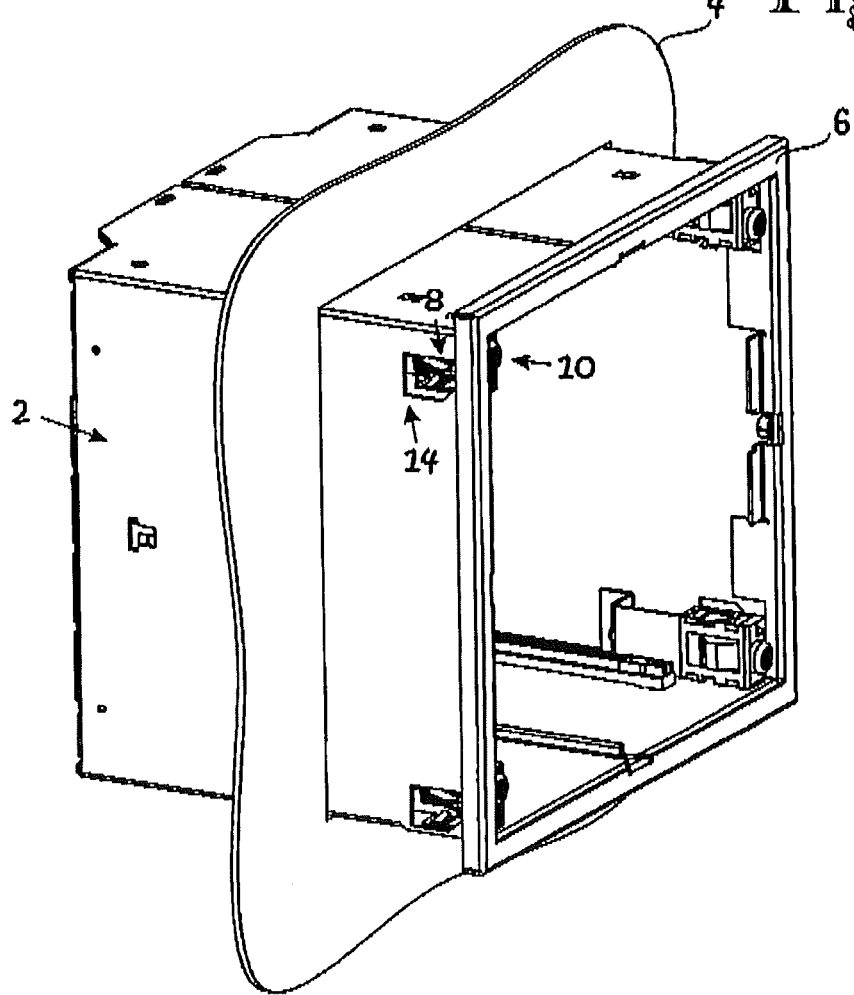
FIG. 2 illustrates a casing mounted with four fastening mechanisms of FIG. 1 into an opening in a wall.

FIG. 2 illustrates the mounting of a casing 2 provided with four fastening mechanisms of FIG. 1 into an opening in a wall. To the front edge of the casing 2 there is fastened a collar element 6 arranged to attach to the wall 4, in the vicinity of the edge of the wall opening. In the example of FIG. 2 the collar element 6 surrounds the front edge of the casing 2 entirely.

In the embodiment of FIG. 2 the fastening mechanisms are installed to the sides of the casing 2 in such a way that there are two mechanisms on both sides. In FIG. 2 the pressing elements are in the normal position, the beveled guide parts 9 that project from the bodies 7 pointing from the casing 2 outwards such that the width of the casing 2 as measured from the ends of the beveled guide parts 9 exceeds the width of the opening in the wall 4.

The body 7 of the pressing element 8 of FIG. 1 has a diameter that is substantially constant in relation to the axis of rotation 11. The shape of the beveled guide part 9 projecting from the body 7 resembles an airplane wing with a beveled leading edge. The beveled guide part 9 projects from the body 7 at a relatively gentle angle. The edge of the beveled guide part 9 that attaches to the edge of the opening in the wall 4 when the casing 2 is pushed into the opening is also beveled. In FIG. 1 the edge of the beveled guide part 9 of the pressing element 8 has been beveled on the upper side thereof, which allows the beveled guide part 9 to be made to turn downward when it meets the wall 4.

The point part of the screw means 10 is provided with support means 16 supporting the point in directions perpendicular to the axis 11. If desired, the support means 16 of the point part of the screw means 10 can be made to restrict the moving of the screw means 10 in the longitudinal direction of the casing 2.

In the fastening mechanism of FIG. 1, the support means 16 supporting the point part of the screw means 10 comprise a hole produced in the surface extending perpendicularly to the axis 11, the screw means 10 running through the hole. The diameter of this hole is substantially equal to the diameter of the portion of the screw means 10 at the hole. The portion of the screw means 10 contacting the support means 16 supporting the point part is preferably unthreaded. In the structure of FIG. 1 the moving of the screw means 10 in the longitudinal direction of the casing can be restricted for example by providing the screw means 10 with a flange protruding therefrom, the outer diameter of the flange being greater than the diameter of the hole in the support means 16 of the point part of the screw means 10.

As stated above, the total width of a casing 2 whose pressing elements 8 are in their normal position is greater than the width of the opening in the wall 4. When the casing 2 is pushed sufficiently deep into the opening in the wall 4, the beveled guide parts 9 of the pressing elements are in contact with the edge of the opening in the wall 4. As the pushing of the casing 2 continues, the torque caused by the wall 4 to each pressing element 8 turns the pressing elements 8 to their mounting position, the width of the casing 2 measured from the ends of the beveled guide parts 9 then being equal to the width of the opening in the wall 4. When the pressing elements 8 are in the mounting position, the casing 2 can be pushed into its final mounting depth, i.e. to a position in which the collar element 6 is in contact with the wall 4.

The screw means 10 is arranged to move the pressing element 8 in the longitudinal direction of the casing 2, i.e. in the direction in which the casing 2 is pushed into the opening in the wall 4. Since the pressing element 8 is movable in the longitudinal direction of the casing 2, it is possible to achieve both the pressing of the pressing element 8 against the wall 4 on the wall side opposite to the mounting direction of the casing and the adjustment of the fastening mechanism to suit different wall thicknesses. The pressing element 8 is moved in the longitudinal direction of the casing 2 for example by turning the screw means 10 at its head. The head of the screw means 10 may be of a type that can be turned by means of a screwdriver and/or a socket wrench, for example, or of a manually turned type.

In the structure of FIG. 1 the inner surface of the body 7 of the pressing element 8 is provided with a threading capable of co-operating with a threaded part of the screw means 10 for moving the pressing element 8 in the longitudinal direction of the casing 2. The threading on the inner surface of the body 7 of the pressing element 8 and the threaded part of the screw means 10 are visible in FIG. 1 in a cross-section taken along arc A-B. The dimensions of the threading of the inner surface of the body 7 of the pressing element 8 and the threaded part of the screw means 10 are exaggerated for clarity purposes. In the structure of FIG. 1, the spring means 12 is preferably mounted to the outer surface of the body 7 of the pressing element 8, whereby the spring means 12 is not forced to slide on the threaded portion of the screw means 10 when the pressing element 8 is moved in the longitudinal direction of the casing 2.

When the pressing element 8 of FIG. 1 is moved in the longitudinal direction of the casing 2 by turning the screw means 10, a first end of the spring means 12 remains attached to the body 7 of the pressing element 8, while a second end thereof slides on a counter surface produced on the casing 2.

The screw means 10 of the fastening mechanism of the invention is preferably arranged not to move in its axial direction when it is turned. In addition, the screw means 10 are preferably arranged such that they cannot be detached from the casing 2. With this kind of structure it is possible to prevent the screw means 10 from coming loose and being lost. There are preferably no parts in the fastening mechanism of the invention that the user could detach from it.

In the fastening mechanism of the invention the axis of rotation 11 of the pressing element 8 is preferably substantially parallel with the longitudinal direction of the casing 2, as shown in FIGS. 1 and 2.

Before the casing 2 is pushed into the opening in the wall, the pressing surface of the pressing element 8 is preferably moved away from the collar element 6 by a distance corresponding to the thickness of the wall 4. The distance corresponding to the thickness of the wall refers here to a distance that is at least equal to and preferably somewhat greater than the wall thickness to facilitate the mounting. The pressing surface of the pressing element 8 refers here to the pressing element 8 surface to be brought into contact with the wall 4 to achieve a force that will keep the casing 2 in place. In the fastening mechanism of FIG. 1 the pressing surface of the pressing element 8 is the "rear surface" of the beveled guide part 9. The pressing surface of the pressing element 8 is shaped and positioned such that it does not extend further away from the casing 2 than the beveled guide part 9.

When desired, the fastening mechanism of the invention can be configured such that the distance of the pressing element 8 from the collar element 6 can be made longer by turning the screw means 10 even when the casing 2 has been pushed into its final mounting depth but the pressing element 8 is not yet deep enough to come into contact with the opposite side of the wall 4. When using the fastening mechanism of FIG. 1, for example, the pressing element 8 that is in radial direction in contact with the surface of the opening in the wall 4 can be slid in the longitudinal direction of the casing 2 by turning the screw means 10.

When the casing 2, in which the distance of the pressing elements 8 from the collar element 6 has been adjusted to correspond to the thickness of the wall 4, is pushed sufficiently deep into the opening in the wall 4, the pressing elements 8 are capable of turning into their normal position on the opposite side of the wall 4. Thus the width of the casing 2, as measured from the ends of the beveled guide parts 9, exceeds that of the opening in the wall 4, thereby preventing the casing 2 from moving back in the direction from where it was pushed into the opening.

When the casing 2 has been pushed into its final mounting depth, the pressing surfaces of the pressing elements 8 are at a distance from the side of the wall 4 with which they are arranged to come into contact so as to produce a force that will keep the casing 2 in place. This distance, which in an ideal situation would be substantially zero, depends on how accurately the distance between the pressing elements 8 and the collar element 6 has been adjusted prior to the mounting of the casing 2 to correspond to the thickness of the wall 4. By turning the screw means 10, this distance is reduced until the pressing element 8 is in contact with the wall 4. The turning of the screw means 10 is then continued until the force applied to the wall 4 by the pressing element 8 reaches a desired value. The pressing force of each pressing element 8 of the casing 2 having been adjusted to a desired value, the pressing force caused to the wall 4 by the pressing elements 8 and the collar element 6 keeps the casing in place.

To detach the casing 2 from the wall 4, first the pressing force exerted to the wall 4 by the pressing elements 8 and the collar element 6 is cancelled. The force is cancelled by appropriate turning of the screw means 10. In addition, to allow the casing 2 to be removed from the opening in the wall 4, the pressing elements 8 must be turned into the mounting position.

The casing 2 in FIG. 2 comprises for each pressing element 8 a turning means 14 arranged to turn the respective pressing element to the mounting position when the pressing element 8 is moved for a predetermined distance in the longitudinal direction of the casing 2, away from the collar element 6. In FIG. 2 each turning means 14 of the pressing element 8 consists of the edge of the opening made to the casing 2, the beveled guide part 9 of the pressing element 8 being in contact with the edge when the pressing element 8 is moved towards the turning means 4 in a sufficient manner.

The opening in the casing 2, whose edge forms the turning means 4, is sufficiently long in the longitudinal direction of the casing 2 to allow the distance of the pressing element 8 and the collar element 6 to be adjusted so that it is suitable for different wall thicknesses. In vertical direction, the opening is sufficiently large to allow the pressing element 8 to turn between its normal position and its mounting position. On the other hand, the opening is formed in the vertical direction so as not to allow the pressing element 8 to turn beyond its normal position in relation to its axis 11, i.e. to a position in which its turning angle in relation to its mounting position would be greater than the turning angle of the normal position in relation to the mounting position. This ensures that when the casing 2 is tightened against the wall 4, the pressing element 8 is not able to turn into a position in which is does not protrude sufficiently from the casing 2 to produce a force against the wall 4.

The structure shown in FIG. 2 thus allows each pressing element 8 to be turned to its mounting position by turning the respective screw means 10. With each pressing element 8 of the casing 2 turned to the mounting position, the casing 2 can be pulled out of the opening in the wall 4. The structure shown in FIG. 2 enables the pressing elements 8 to be turned to the mounting position both when the casing 2 is in the opening in the wall 4 and when it is separated from the wall.

The use of the fastening mechanism of the invention has been described above in a situation where the pressing element 8 is capable of coming into contact with the side of the wall 4 opposite to the mounting direction. However, it is obvious that the surface to which the pressing elements 8 apply the force that keeps the casing 2 in place does not necessarily need to be on the other side of the wall. For example, when a thick wall 4 is concerned, the wall can be provided with radial recesses made into the wall thickness and the pressing elements 8 can then be brought into contact with the surfaces of the recesses to provide the force keeping the casing 2 in place.

The fastening mechanism of the invention is suitable for fastening not only casings of plug-in units but also other similar casings to openings in a wall. The fastening mechanism of the invention can be arranged such that the plug-in unit, or a similar component, can be attached to the casing when the casing is mounted to the wall. Further, the fastening mechanism of the invention can be used in devices that do not have a detachable component such as a plug-in unit.

It is apparent to a person skilled in the art that the basic idea of the invention can be implemented in various ways. The invention and its embodiments are therefore not restricted to the above examples but can be varied within the scope of the claims.

The invention claimed is:

1. A fastening mechanism for fastening a casing into an opening in a wall, the mechanism comprising: a collar element attached to the casing and arranged to be in contact with a first side of the wall, in a vicinity of an edge of the opening; a pressing element arranged to be in contact with a second side of the wall, in the vicinity of the edge of the opening; the collar element and the pressing element being arranged to co-operate to direct a pressing force to the wall in order to achieve a force that keeps the casing in place; and a screw means comprising a threaded part and an end part for turning the screw means, the screw means being arranged to move the pressing element in the longitudinal direction of the casing when the screw means is being turned and to achieve at least some of the force by which the collar element and the pressing element are pressed against the wall, wherein the pressing element is arranged to rotate about an axis of rotation of the pressing element between a normal position and a mounting position, the axis of rotation of the pressing element being substantially parallel with the longitudinal direction of the casing whereby, when the pressing element is in the normal position of the pressing element, the pressing element is capable of coming into contact with the second side of the wall to achieve the force that keeps the casing in place, and, when the pressing element is in the mounting position of the pressing element, the pressing element allows the casing to be pushed into a final mounting depth of the casing, and wherein the pressing element comprises a body and a beveled guide part projecting from the body and shaped such that when the casing is pushed into the opening in the wall, the beveled guide part co-operates with the wall to turn the pressing element from the normal position to the mounting position.

2. The fastening mechanism according to claim 1, wherein the fastening mechanism further comprises a spring means operationally connected to the pressing element and configured such that in a situation where the pressing element is deviated from the normal position of the pressing element, the spring means applies to the pressing element a force that tends to turn the pressing element to normal position of the pressing element.

3. The fastening mechanism according to claim 1 wherein the casing comprises for each pressing element a turning means arranged to turn the respective pressing element to the mounting position when the pressing element is moved for a predetermined distance in the longitudinal direction of the casing, away from the collar element, whereby the turning means makes it possible to turn the pressing element to the mounting position of the pressing element by turning the screw means.

4. The fastening mechanism according to claim 1, wherein the pressing element is mounted co-axially with the screw means, the screw means being partly inside the pressing element, and wherein the inner surface of the pressing element is provided with threading capable of co-operating with the threaded part of the screw means to move the pressing element in the longitudinal direction of the casing.

5. The fastening mechanism according to claim 4, wherein the spring means comprises a torsion spring mounted co-axially with the screw means and the pressing element, a first end of the spring being attached to the pressing element while a second end thereof is arranged to slide along a counter surface produced on the casing when the pressing element is moved in the longitudinal direction of the casing.

6. The fastening mechanism according to claim 1, wherein the screw means does not move in the longitudinal direction of the casing when the screw means is turned.

7. The fastening mechanism according to claim 1, wherein the turning of the pressing element along with the screw means is substantially prevented, and thus the pressing element remains in the normal position of the pressing element when the pressing element is moved in the longitudinal direction of the casing by turning the screw means.

8. The fastening mechanism according to claim 1, wherein the collar element surrounds a front edge of the casing substantially entirely whereby, when the casing has been fastened into the opening in the wall, the contact surface bringing the collar element into contact with the wall surrounds the opening substantially entirely.

9. The fastening mechanism according to claim 1, wherein the pressing element and the screw means are integrated into the casing and cannot therefore become loose and be lost.

10. The fastening mechanism according to claim 1, wherein the first side of the wall is the side from the direction of which the casing is pushed into the opening in the wall.

11. The fastening mechanism according to claim 1, wherein the fastening mechanism is configured for fastening the casing of a plug-in unit into the opening in the wall.

* * * * *

UNITED STATES PATENT AND TRADEMARK OFFICE
CERTIFICATE OF CORRECTION

PATENT NO. : 7,648,213 B2
APPLICATION NO. : 10/555698
DATED : January 19, 2010
INVENTOR(S) : Simo Kangas It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this

Sixteenth Day of November, 2010

David J. Kappos
*Director of the United States Patent and Trademark Office*